Jan. 8, 1924. 1,479,935

D. W. SMITH

CRUST TRIMMING MECHANISM FOR PIE MAKING MACHINES

Filed Aug. 25, 1922

Inventor:
Dennis Wood Smith

Patented Jan. 8, 1924.

1,479,935

UNITED STATES PATENT OFFICE.

DENNIS WOOD SMITH, OF CHICAGO, ILLINOIS, ASSIGNOR TO COLBORNE MANUFACTURING COMPANY, OF CHICAGO, ILLINOIS, A CORPORATION OF ILLINOIS.

CRUST-TRIMMING MECHANISM FOR PIE-MAKING MACHINES.

Application filed August 25, 1922. Serial No. 584,243.

*To all whom it may concern:*

Be it known that I, DENNIS WOOD SMITH, a citizen of the United States of America, and a resident of Chicago, county of Cook and State of Illinois, have invented a new and useful Improvement in Crust-Trimming Mechanisms for Pie-Making Machines, of which the following is a specification.

This invention relates to pie-making machines and particularly to the mechanism for trimming the pie crusts.

The main objects of this invention are to provide an improved form of crust trimming mechanism adapted to trim the pie crust on a circumference larger than that of the pie-tin so that, as a result of a subsequent shrinkage of the dough, the circumference of the crust will never be materially less than that of the rim of the pie-tin; to provide a trimming mechanism of this kind which is capable of trimming the pie crusts while the pies are being continuously carried along by a conveyer; and to provide an improved form of pie-tin carrier having a crust trimming edge of greater circumference than that of the rim of the tin.

An illustrative embodiment of this invention is shown in the accompanying drawings, wherein—

Figure 1:
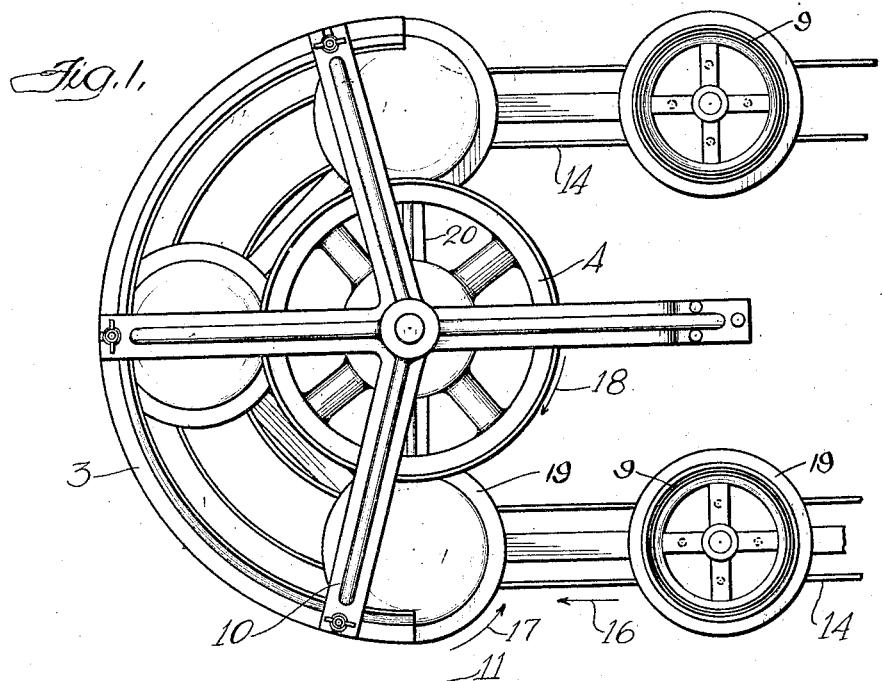
Figure 1 is a plan of a crust trimming mechanism embodying this invention, part of the conveyer being also shown.
Figure 2:
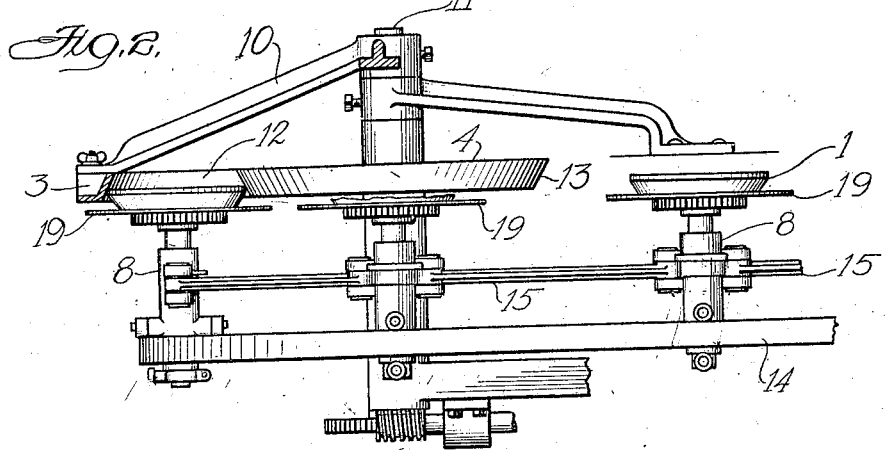
Fig. 2 is a side elevation, partly in section, of the same.
Figure 3:
Fig. 3 is an enlarged sectional detail of the trimming mechanism.

One of the most common forms of crust trimming mechanisms for pie-making machines now in use includes a pair of concentrically arranged elements having inclined trimming surfaces arranged to coact directly with the rims of the pie-tins. The pie-tins are supported on rotatable carriers which are moved by a conveyer through a predetermined path, so as to cause the edges of the pie-tins to roll between the two trimming elements for trimming the crusts on the tins. A crust trimming mechanism of the above character is illustrated in Patent No. 847,649, issued March 19, 1907, to Oliver Colborne.

In the baking of pies, the edge of the crust has a tendency to shrink, with the result that, if the crust has been trimmed to the exact size of the pie tins, part of the rim of the tin will be exposed after the crust has shrunk. The optical effect of the exposed rim of the tin makes the finished pie appear smaller than it is.

This objectionable feature is overcome by crust trimming machines embodying the present invention, wherein the pie-tin carrier is provided with a crust trimming edge of greater circumference than that of the rim of the pie tins, for trimming the pie crust on a circumference larger than that of the pie-tin, so that, as a result of subsequent shrinkage of the dough, the circumference of the crust will never be materially less than that of the rim of the tin.

The supporting frame structure and certain other parts of the pie-forming machine have been omitted from the drawings since they are well understood in the art and their disclosure is not essential to a proper understanding of the present invention.

In the specific embodiment illustrated, the machine includes a plurality of pie-tin supports 1, having each a crust trimming edge 2 arranged to coact with trimming elements 3 and 4.

As illustrated, each of the pie-tin supports 1 comprises a seat 5 arranged to receive a pie-tin 6, and a centrally located spindle 7 rotatably mounted in a carrier 8. The spindles 7 are yieldingly supported by springs, not shown, embracing the spindles and mounted within the carriers 8. Formed in the upper face of the seat 5 and spaced inwardly from the outer periphery of the support 1, is an annular groove 9, arranged to receive the rim of the pie-tin 6, so as to locate said rim within the trimming edge 2 formed by the periphery of the support.

The trimming element 3 is arcuate in form, and is supported on spider arms 10 mounted on a vertical shaft 11 which is fixed to the frame structure of the machine. The inner face of the stationary element 3 is inclined upwardly and inwardly to form a crust trimming surface 12.

The trimming element 4 is in the form of a wheel loosely journaled on the shaft 11 in concentric relation to the stationary element 3 and the path of the spindles 7. The outer periphery of the wheel 4 is inclined upwardly and inwardly to form a trimming surface 13. The trimming surfaces 12 and 13 are inclined at equal angles to the axes of the spindles 7, and the path of the spindles is midway between said surfaces, so that the trimming edges 2 of the pie-tin supports 1 will roll in contact with both of said trimming surfaces when the supports are carried along a horizontal path.

In the form shown, the carriers 8 are slidably supported on a horizontally disposed endless track 14 and are connected together by links 15. Suitable mechanism, such as a driving sprocket 20, is provided for moving the carriers along the track 14 so as to cause the pie-tin supports 1 to travel along a horizontal path to coact with the various pie forming mechanisms.

In operation, the carriers 8 are continuously driven in the direction of the arrow 16, shown in Fig. 1. The engagement of the pie-tin supports 1, with the stationary arcuate element 3, causes the pie-tin supports to rotate in the direction of the arrow 17. Since the trimming wheel 4 is free to rotate, it will rotate in the direction of the arrow 18 through its contact with the pie-tin supports. The springs, not shown, which yieldingly support the spindles 7, hold the supports 1 in firm contact with the trimming surfaces 12 and 13, so that the pie crusts overhanging the edges of the supports are cut off and fall upon plates 19, which are carried by the spindles 7 and located immediately below the supports 1. Since there are always two or more pie-tin supports in contact with the periphery of the trimming wheel 4, the rotation of said wheel is continuous throughout the operation of the machine. The plates 19 catch the trimmings and hold them until they are removed at a different part of the machine after passing from the crust trimming device. In practice, the vertical movement of the spindles 7 is slight, being only sufficient to insure the proper pressure between the trimming edges 2 and the trimming surfaces 12 and 13.

Although but one specific embodiment of this invention has been herein shown and described it will be understood that numerous details of the construction shown may be altered or omitted without departing from the spirit of this invention as defined by the following claims.

I claim:

1. A device of the class described comprising a crust trimming element having a trimming surface, a carrier including a pie-tin support having a trimming edge of greater diameter than the pie-tin, and mechanism for moving said carrier along a path to bring said trimming edge into engagement with said trimming surface for trimming a pie crust.

2. A device of the class described comprising a crust trimming element having a trimming surface, a carrier, a pie-tin support on said carrier, said support having a seat formed in the top thereof to receive a pie-tin and locate the rim thereof within the periphery of said support, and mechanism for moving said carrier along a path to bring the periphery of said support into contact with said trimming surface.

3. A device of the class described comprising a crust trimming element having a trimming surface, a carrier including a circular rotatable pie-tin support having a concentrically arranged annular grove formed therein to provide a seat for the rim of a pie-tin, the periphery of said support being formed to provide a trimming edge of greater diameter than said seat whereby the rim of the pie-tin will be spaced inwardly from said trimming edge, and mechanism for moving said carrier along a path to bring said trimming edge into engagement with said trimming surface for trimming a pie crust.

Signed at Chicago this 23 day of Aug. 1922.

DENNIS WOOD SMITH.